(No Model.) 4 Sheets—Sheet 1.

C. WOLCOTT.
SASH CORD GUIDE.

No. 515,809. Patented Mar. 6, 1894.

Witnesses
A. W. Stipek.
F. H. Griswold.

Inventor
Clayton Wolcott.
By James Shepard.
Atty.

(No Model.) 4 Sheets—Sheet 2.
C. WOLCOTT.
SASH CORD GUIDE.
No. 515,809. Patented Mar. 6, 1894.
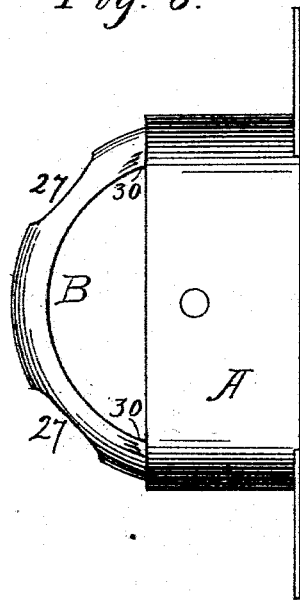
Fig. 6.
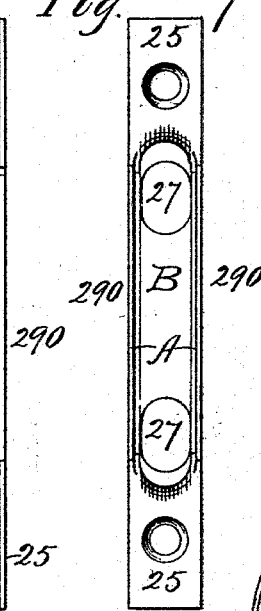
Fig. 7.
Fig. 10. Fig. 11.
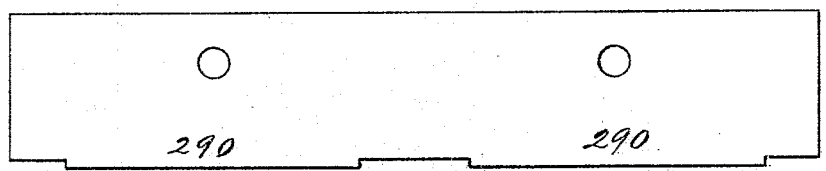
Fig. 8.
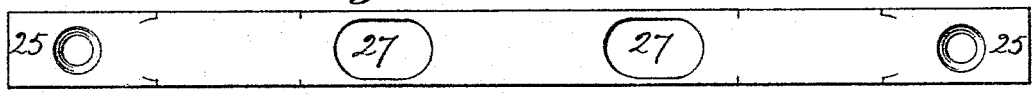
Fig. 9.
Witnesses
G. W. Stipek.
F. H. Griswold.
Inventor
Clayton Wolcott
By James Shepard
Atty.

(No Model.) 4 Sheets—Sheet 3.

C. WOLCOTT.
SASH CORD GUIDE.

No. 515,809. Patented Mar. 6, 1894.

Witnesses
G. W. Stipek.
F. H. Griswold.

Inventor
Clayton Wolcott
By James Shepard
Atty.

(No Model.) C. WOLCOTT. 4 Sheets—Sheet 4.
SASH CORD GUIDE.

No. 515,809. Patented Mar. 6, 1894.

Witnesses
G. W. Stipek
F. H. Griswold

Inventor
Clayton Wolcott
By James Shepard
Atty

UNITED STATES PATENT OFFICE.

CLAYTON WOLCOTT, OF HARTFORD, CONNECTICUT.

SASH-CORD GUIDE.

SPECIFICATION forming part of Letters Patent No. 515,809, dated March 6, 1894.

Application filed July 7, 1893. Serial No. 479,854. (No model.)

*To all whom it may concern:*

Be it known that I, CLAYTON WOLCOTT, a citizen of the United States, residing at Hartford, in the county of Hartford and State of Connecticut, have invented certain new and useful Improvements in Sash-Cord Guides, of which the following is a specification.

My invention relates to improvements in sash cord guides, and the objects of my improvement are simplicity and economy in construction and general efficiency of the article.

Figure 1:
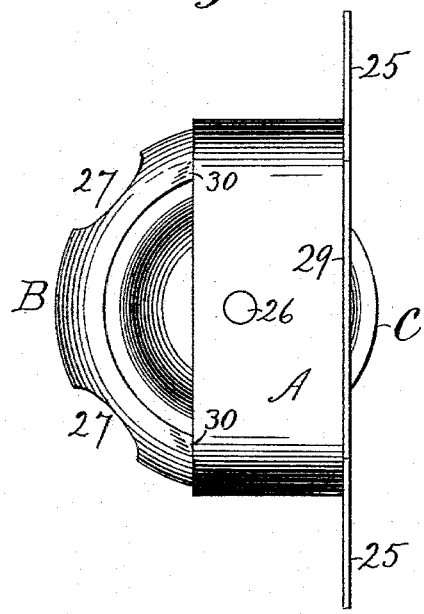
Figure 2:
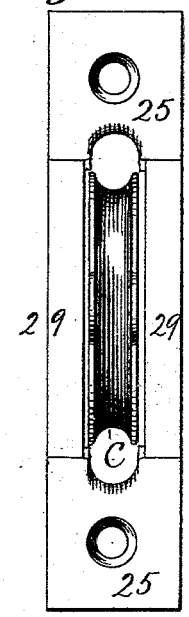
Figure 3:
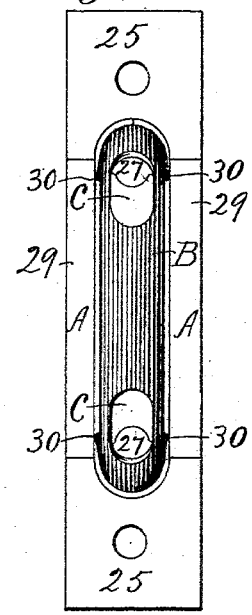
Figure 4:
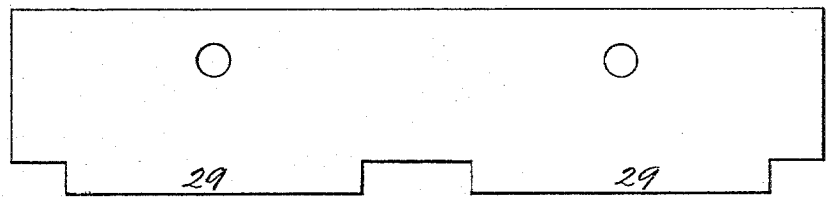
Figure 5:
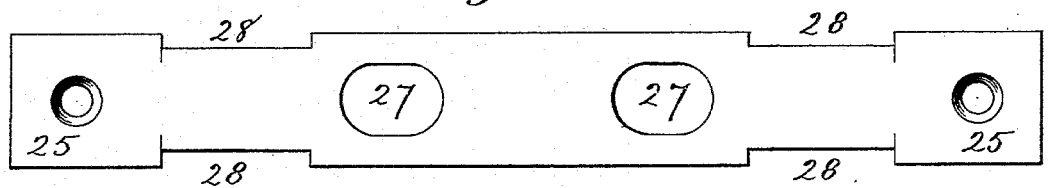
Figure 12:
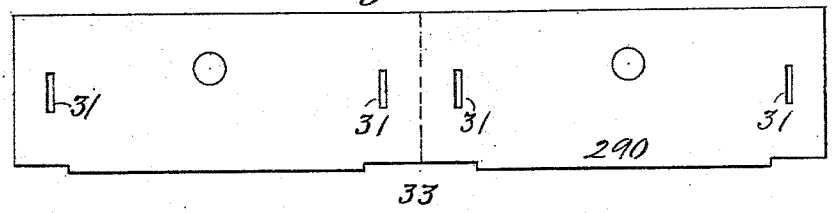
Figure 13:
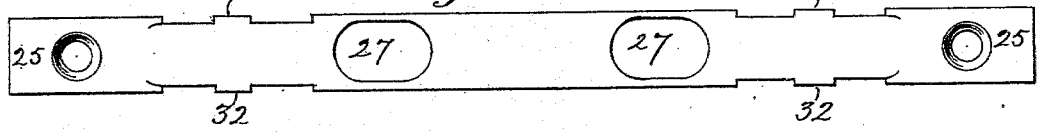
Figure 14:
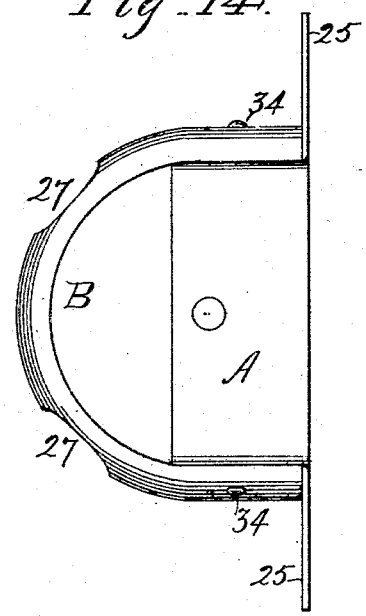
Figure 15:
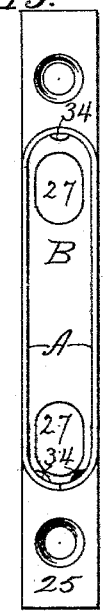
Figure 16:
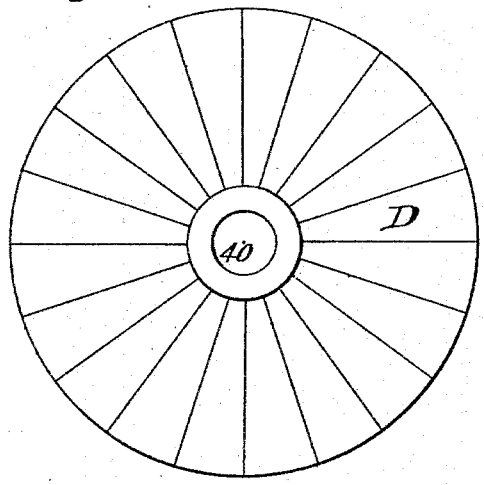
Figure 17:
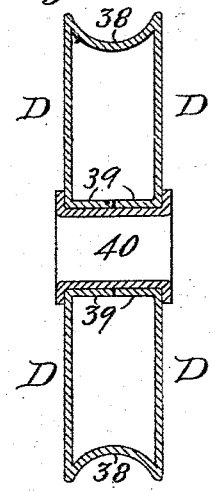
Figure 18:
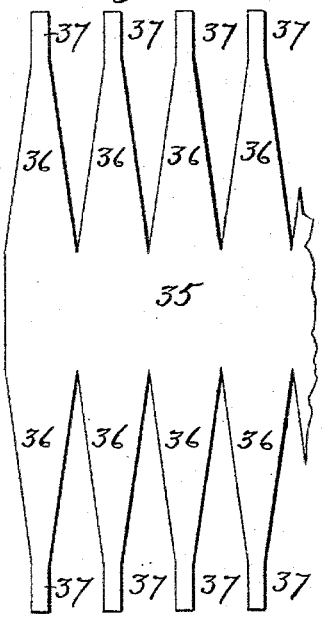
Figures 19, 20, 22, 23:
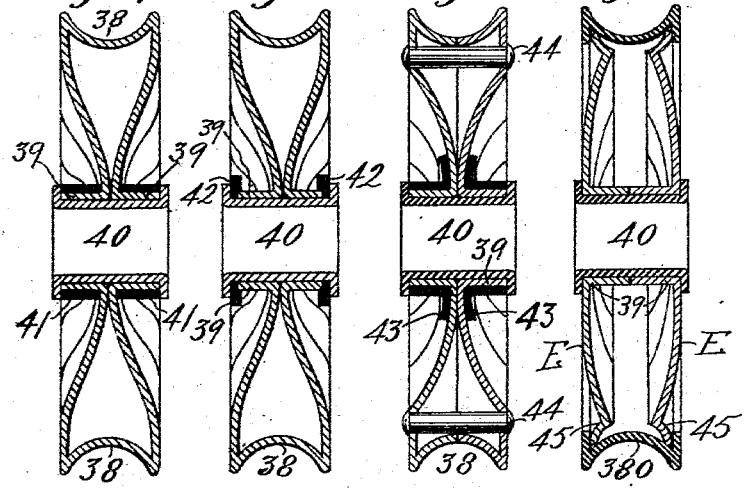
Figure 24:
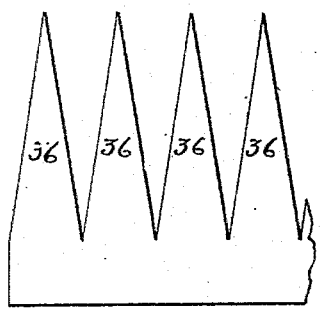
Figure 21:
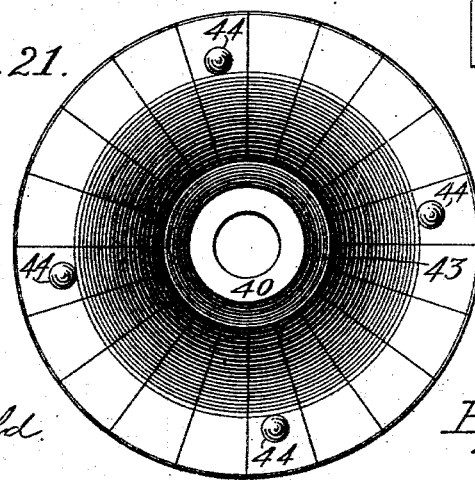

In the accompanying drawings: Figure 1 is a side elevation of my sash cord guide. Fig. 2 is a front view of the same. Fig. 3 is a rear elevation. Fig. 4 is a plan view of the blank for forming the cheeks. Fig. 5 is a plan view of the blank for forming the back rim and face plate ends. Fig. 6 is a side elevation of a frame for my sash cord guide of a somewhat modified form. Fig. 7 is a front view of the same. Fig. 8 is a plan view of the blank for forming the cheeks of said frame. Fig. 9 is a plan view of the blank for forming the back rim and face plate ends of said frame. Fig. 10 is a side elevation of the frame for my sash cord guide in still another form. Fig. 11 is a front view of the same. Fig. 12 is a plan view of the blank for forming the cheeks of the frame in Figs. 10 and 11. Fig. 13 is a plan view of the blank for forming the back rim and face plate ends of said frame. Fig. 14 is a side elevation of my frame in still another form. Fig. 15 is a front elevation of the same. Fig. 16 is a detached side elevation of the pulley for my sash cord guide in the preferred form, the same together with the following figures being on an enlarged scale. Fig. 17 is a central section of the same. Fig. 18 is a plan view of a portion of the blank for forming the peripheral rim and sides of the pulley. Figs. 19 and 20 are central sectional views of my pulley in other forms. Fig. 21 is a side elevation of my pulley in still another form. Fig. 22 is a central section of the pulley as shown in Fig. 21. Fig. 23 is a central section of my pulley in still another form, and Fig. 24 is a plan view of the blank for forming the pulley sides and part of the peripheral rim of the pulley as shown in Figs. 21 and 22.

A designates the cheeks or sides of my pulley frame, B the back rim, 25 the face plate ends which are bent from the ends of the back rim B, and C designates the pulley secured within said frame upon the pin or axle 26 which extends through the cheeks A A. I form the back rim B and integral face plate ends 25 from a blank substantially as shown in Fig. 5, the same being perforated at its ends to form screw holes and at 27 to form holes for the cord to pass through. Said blank is also notched or recessed at its edges as at 28. The portion of this blank between the face plate ends is bent transversely and curved longitudinally to form the back rim B, while the face plate ends 25 are bent outwardly as shown. The cheeks A A, I prefer to blank out from a single piece as shown in Fig. 4 with flanges 29 at one edge. This blank is then bent at its middle portion and at each end so as to bring the cheeks parallel to each other with rounded ends that inclose the back rim B at the parts which are notched as at 28 in Fig. 5. The flanges 29 are bent outwardly from the cheeks in alignment with the face plate so as to fill the space between the face plate ends as best shown in Figs. 2 and 3. The inner corner of the back rim is turned outwardly as at 30 over the rear edge of the cheek pieces, thereby firmly securing together the pulley frame. The pulley axle will also furnish additional security, and if desired the parts may be further secured by rivets in any proper manner.

In Figs. 6, 7, 8 and 9 I have shown substantially the same construction, excepting that the flanges 29 are omitted and the back rim and face plate ends are made narrower. The cheeks or side pieces are also provided with projections 290 at the front edge, but instead of being bent at an angle to the cheek pieces, they remain flat therewith and enter in between the face plate ends as shown. The blank for the back rim and face plate ends may be slit partly through where the face plate ends are turned outwardly from the ends of the back rim if desired.

In Figs. 10, 11, 12 and 13 I form like projections or tenons 290 on the cheeks and I also form mortises 31 near the ends of said cheek pieces with tenons 32 at the edges of the blank for the back rim as shown in Fig. 13 and after bending the cheek pieces into form and placing them around the back rim, these tenons 32 enter the mortises 31 and may be riveted therein to secure the parts together. I prefer to form the two cheeks of a single blank, but it is evident that if desired, the same might be formed of two blanks by simply dividing the blank, Fig. 12, on the line 33. The construction is substantially the same whether these cheeks are formed of two pieces or only one.

The frame shown in Figs. 14 and 15 is substantially the same in construction as the other frames and differs from the frames shown in Figs. 10 and 11 principally by having the back rim on the outside of the cheeks instead of having the cheeks surround the back rim. These I secure together in any proper manner, as for instance by means of rivets 34. The blanks for this frame, Figs. 14 and 15, may be simple strips of metal with straight edges.

In all of the frames shown, the frame is formed of the back rim and integral face plate ends held in position by the cheeks which connect the front ends of the rim and face plate ends.

While it is believed that the frame will be efficient and operative without any additional parts, if desired it might be provided with a face plate cap for covering the outer ends of the face plate and front portions of the cheeks.

I form the sides of my pulley from a blank consisting of a strip of metal with a connected series of points projecting from the edge thereof as shown in Figs. 18 and 24. I prefer to form this blank as shown in Fig. 18, the length of the strip being long enough to form the periphery of the pulley. The middle portion 35 of this blank is designed for forming the rim or periphery of the pulley, while the tapering portions 36 of the points are designed for forming the sides of the pulley and the tips 37 are for forming the center portion of my pulley. This blank is properly bent to form the periphery 38 of the pulley from its middle portion, while the points are bent at or near the junction of the continuous strip in the body of the blank to form the sides D of the pulley and the tips 37 are bent inwardly at an angle to the sides D to form the hub supporting portion 39. When the pulley is thus formed the edges of the metal in the points and tips will come close together and form substantially solid sides. Within the hub supporting portion 39, I insert a tube or sleeve 40 with its ends headed over as shown to hold the central portion of the pulley together and form the hub.

In Figs. 19 and 20 I have shown pulleys formed from this same blank, but instead of making the sides parallel to each other, the sides are bent inwardly and the tips 37 which form the hub supporting portion 39 are bent outwardly instead of inwardly. A sleeve or ring 41 is placed over them and a tubular sleeve 40 as before described is inserted to hold the same firmly together. Fig. 20 shows the same construction, excepting that the rings or sleeves 41 are omitted and slightly recessed washers 42 are interposed between the headed ends of the sleeve 40 and ends of the hub bearing portions 39.

In Figs. 21 and 22 I have shown substantially the same construction as in Fig. 19, excepting that the wheel is formed from two blanks instead of one, the same as would be formed if the blank Fig. 18, were divided longitudinally through its middle into two parts. I have also provided the sleeves which cover the hub bearing portions with flanges 43, which extend a short distance up the sides of the wheel and the two parts of the wheel are secured together near their periphery by rivets 44. I prefer to form the tips 37 of the prongs of the blanks with parallel edges so that their sides will fit each other when formed into the hub bearing portion, but this is not essential and economy in stock can be made by allowing the taper of the points to continue to the end as shown in Fig. 24. This form of blank may be used whenever desired, either for a whole or a half pulley. In some cases I may form the sides of the pulley from two blanks with the connecting strip of the points formed into a partial rim 45 as shown in Fig. 23, while the points are formed into the sides E of the pulley and the tips into the hub bearing portion 39, the hub portion being secured as before described by the hollow sleeve 40, while the two partial rims 45 are held together at the periphery by means of a separately constructed peripheral rim 380 with its side edges turned over to cover and interlock the partial rims 45 as shown. In all of these pulleys it will be seen that the sides of the pulley are formed from a connecting strip having a series of points, the strip being employed in the rim or periphery of the wheel.

I claim as my invention—

1. The herein described frame for a sash cord guide consisting of the back rim and face plate ends formed of one strip of metal and the sides or cheeks extending longitudinally with said face plate ends and secured to the front ends of said back rim, substantially as described and for the purpose specified.

2. The herein described frame for a sash cord guide consisting of the back rim and integral face plate ends and the sides or cheeks extended around the front ends of said back rim and resting in notches or recesses formed in its edges, substantially as described and for the purpose specified.

3. The herein described frame for a sash cord guide consisting of the back rim and integral face plate ends and the sides or cheeks formed around the front ends of said rim and having their front fitted to and filling the space between said face plate ends, substantially as described and for the purpose specified.

4. The herein described frame for a sash cord guide consisting of the back rim and integral face plate ends and the sides or cheeks extending longitudinally with said ends and having outwardly turned flanges at their front edges in alignment with said face plate ends, substantially as described and for the purpose specified.

5. The herein described frame for a sash cord guide consisting of the back rim and integral face plate ends and the sides or cheeks formed around the front ends of said back rim and secured at their back edge by means of points 30 cut and bent from the contiguous edges of said back rim, substantially as described and for the purpose specified.

6. The herein described pulley consisting essentially of the peripheral rim and the pulley sides formed from a connected series of points bent over from said rim, substantially as described and for the purpose specified.

7. The herein described pulley having its sides formed from a series of points bent inwardly from a connecting strip of metal, substantially as described and for the purpose specified.

8. The herein described pulley having its sides formed from a series of points bent inwardly from a connecting strip of metal and having the tips of said points bent at an angle to said sides for forming the hub bearing portion, substantially as described and for the purpose specified.

9. The herein described pulley having its sides formed of a series of points bent inwardly from a connecting strip of metal, the tips of said points being bent at an angle to said sides to form the hub bearing portion and a hollow sleeve secured inside of said hub bearing portion, substantially as described and for the purpose specified.

CLAYTON WOLCOTT.

Witnesses:
CHARLES E. GROSS,
C. C. McCRAE.